(12) United States Patent
Rolleston et al.

(10) Patent No.: US 8,416,451 B2
(45) Date of Patent: Apr. 9, 2013

(54) NATURAL LANGUAGE COLOR COMMUNICATION AND SYSTEM INTERFACE

(75) Inventors: Robert J Rolleston, Rochester, NY (US); Geoffrey J Woolfe, Canandaigua, NY (US)

(73) Assignee: Xerox Corporation, Norwalk, CT (US)

( * ) Notice: Subject to any disclaimer, the term of this patent is extended or adjusted under 35 U.S.C. 154(b) by 1055 days.

(21) Appl. No.: 11/857,572

(22) Filed: Sep. 19, 2007

(65) Prior Publication Data

US 2009/0073465 A1 Mar. 19, 2009

(51) Int. Cl.
G06F 15/00 (2006.01)
G06K 9/00 (2006.01)
G09G 5/02 (2006.01)

(52) U.S. Cl. ......... 358/1.9; 358/1.8; 358/2.1; 358/3.01; 358/3.02; 358/3.11; 358/1.15; 358/501; 358/502; 358/503; 382/162; 382/164; 382/165; 382/166; 382/167; 345/589; 345/591; 345/594; 345/600

(58) Field of Classification Search ............ 358/1.9, 358/1.8, 2.1, 3.01, 3.02, 3.11, 1.15, 518, 358/519–540; 382/162, 164, 165, 166, 167; 345/440, 591, 43, 589, 600, 601, 604

See application file for complete search history.

(56) References Cited

U.S. PATENT DOCUMENTS

| | | | |
|---|---|---|---|
| 4,879,594 A * | 11/1989 | Stansfield et al. | 358/518 |
| 5,611,030 A | 3/1997 | Stokes | |
| 6,032,004 A | 2/2000 | Mirabella, Jr. et al. | |
| 6,924,908 B1 * | 8/2005 | Kimia | 358/1.9 |
| 7,031,920 B2 | 4/2006 | Dowling et al. | |
| 7,043,474 B2 | 5/2006 | Mojsilovic et al. | |
| 7,372,596 B2 * | 5/2008 | Tamagawa | 358/1.9 |
| 7,525,684 B2 * | 4/2009 | Majewicz | 358/1.9 |
| 8,184,334 B2 * | 5/2012 | Yamakawa et al. | 358/1.9 |

(Continued)

FOREIGN PATENT DOCUMENTS

| | | | |
|---|---|---|---|
| EP | 1874036 A2 | | 1/2008 |
| JP | 09-265379 | * | 10/1997 |
| JP | 11-194866 A | | 7/1999 |
| WO | 2004027695 A1 | | 4/2004 |

OTHER PUBLICATIONS

Disclosed Anonymously: "Method to translate color requirements from a natural language-like representation into standard color references", Research Disclosure, Mason Publications, Hampshire, GB, vol. 503, No. 65, Mar. 1, 2006, XP007136036 ISSN: 0374-4353.
European Search Report for European Patent Application No. 07110925.0, completed Sep. 10, 2008.

(Continued)

Primary Examiner — Steven Kau
(74) Attorney, Agent, or Firm — Pillsbury Winthrop Shaw Pittman, LLP (57) ABSTRACT

A method and system for controlling color output includes receiving a document containing a color image, producing a first output copy of the document using a first color processing path, receiving at least one natural language request to adjust the color output of the device, adjusting the color output of the device, and producing a second output copy of the document. The method and system further includes presenting natural language descriptions of the effects of color processing paths with or without sample palettes to the user either to solicit a suggestion from the user or present the user with choices based upon the natural language request received.

16 Claims, 4 Drawing Sheets

U.S. PATENT DOCUMENTS

| | | |
|---|---|---|
| 2004/0257598 A1 | 12/2004 | Fujio et al. |
| 2005/0078327 A1* | 4/2005 | Majewicz .................. 358/1.9 |
| 2006/0087517 A1 | 4/2006 | Mojsilovic |
| 2007/0100786 A1 | 5/2007 | Moroney |
| 2008/0137112 A1* | 6/2008 | Tin .......................... 358/1.9 |

OTHER PUBLICATIONS

European Search and Examination Report for European Patent Application No. 08164437.9, mailed on May 19, 2009.

U.S. Appl. No. 11/479,484; Title: Natural Language Color Communication & System Interface; Inventor: Geoffrey Woolfe; Rochester, NY; Filed Jun. 30, 2006.

Spatial Data and the Voronoi Tessellation, by Hrvoje Lukatela and John Russell, Dec. 1992 Dr. Dobb's Journal, p. 1-10.

U.S. Appl. No. 11/762,155; Title: Natural Language Color Selector and Navigator for Selecting Colors from a Color Set; Inventor: Geoffrey J. Woolfe et al.; Rochester, NY; Filed Jun. 13, 2007.

* cited by examiner

NATURAL LANGUAGE COLOR COMMUNICATION AND SYSTEM INTERFACE

The embodiments disclosed herein relate to a color control system, and more specifically, a user-friendly color control system for imaging devices.

Color Management is a technology aimed at getting the right color. Most of today's systems use something akin to the ICC (International Color Consortium) model of having color management profiles for each device and color encoding within a system. The ICC model also allows for the inclusion of abstract profiles that implement color preferences but do not model actual devices. The imaging chain is accomplished by linking a number of these profiles together, and processing data through the linked profiles.

Many color devices allow the user to control which color profiles are used in the imaging chain. The user selects the color profile or a device may come with a preset profile. Even where the user selects the color profile, devices are usually shipped with a default color profile setting. If the current profile does not suit the user's needs (for example, if the user wants the reds darker or the greens slightly bluer), there is currently only a trial-and-error methodology for choosing different profiles (or in general, any color rendering options). This trial and error methodology is often implemented by making changes and then creating a test print under the modified conditions. This trial and error process is often repeated multiple times until pleasing or acceptable results are obtained.

There are many ways to specify color and color difference. Color imaging scientists and engineers often use precise, numeric color specifications based on standardized color spaces and color encodings. Such color specifications are often based on the color matching behavior of a standard human observer. Color matching behavior has been embodied in the CIEXYZ system of colorimetry, for example. Other related systems based on the color matching behavior of a standard human observer include the widely used CIELab or the less common CIELuv system. These color specifications are commonly called device-independent color encodings. Color imaging scientists and engineers also use device-dependent color specifications in which colors can be precisely specified in terms of the color characteristics of a particular device. These color characteristics include the white point and color primaries (or colorants) of the device as well as an appropriate color mixing model. Colors are also specified using color order systems such as the Munsell Book of Color, the Swedish Natural Color System, or the Pantone Color Formula Guide. These systems of color specifications are also precise, but are more commonly used by professionals in the color graphics and design industries rather than color imaging.

Another, more common form of specifying color is to use color names in natural language. Although natural language is a far less precise method of color specification than those discussed above, it is nonetheless the most widely used and best understood method of color specification used by consumers of color. This method of color specification uses common color names, such as red, green, blue, etc. It also uses combinations of common color names to refine the specification. Examples of such combinations include reddish-brown, greenish-blue, yellowish-green etc. In addition, natural language provides many modifying adjectives to provide further subtle discrimination in color specification. Examples of such modifying adjectives include light, dark, bright, saturated, vivid, muddy, moderate, dull, pale, washed-out etc.

Natural color languages use other words and phrases for specifying colors and color differences, which may not be as precisely defined as other color specification methods. Examples of these words and phrases include "slightly less yellow", "much darker", "more saturated", "greener", "significantly punchier", and "a smidge lighter". Now, while these expressions are certainly imprecise, many people commonly use them to describe how they would like their printed material to be changed to meet their requirements. However, color management systems that allow a user to modify an input color or set of input colors generally do not use natural language inputs and require the user to develop an understanding of the behavior of the various controls provided in the user interface of such systems. Such systems are therefore difficult to use for many people.

A color management system could use semantic color adjustments, such as "brighter", "darker", "vivid" etc., which are more readily understood by users than technical implementations (e.g., TRC curves with specified gamma). In other words, the user does not need to understand the implementation; they only need to know the resulting effect, in a language they can appreciate. There are generally no such semantic definitions associated with more complex color transforms such as the 3D or 4D color look-up-tables, which are part of an ICC profile. It may be that the file names, a private tag, or perhaps a comment field within the profile could contain such information, but this is ad hoc.

A natural language interface would be an advantage to most users of color imaging devices. Since both color professionals and consumers of color use and understand the natural language of color, it is a natural choice as a simple-to-use method for color device control software. While verbal descriptions of color and color differences are less precise than the numerical specification of color spaces, one can nonetheless argue that a less precise, but better understood communication system may be preferable to a highly precise but less intelligible interface.

Developing a useful mapping between natural language color specifications and the precise numerical color encodings used in color image processing and device control applications is not simple. An exemplary method for mapping between natural language instructions and actions in a color space was previously disclosed in U.S. patent application Ser. No. 11/479,484, "Natural Language Color Communication and System Interface," the disclosure of which is incorporated by reference herein.

The embodiments disclosed herein describe systems where a semantic description of a color profile (or other color rendering options) may be used to identify, characterize, change, or modify the color profile. These semantic descriptions will be relative to a baseline rendering, and will offer such information in the exemplary form: "color name"+"change magnitude"+"change direction"+"change color property." For example, "Purple becomes very slightly darker, much more colorful, much less magenta, and more blue."

Embodiments of the present invention include a method for controlling color output. The method includes receiving a document containing a color image, producing a first output copy of the document using a first color processing path, receiving at least one natural language request to adjust the color output of the device, adjusting the color output of the device, and producing a second output copy of the document. Adjusting may include selecting a new color processing path.

Embodiments of the present invention also include a color control method that includes receiving document data, presenting natural language descriptions of a set of color processing paths available on a document output device, receiving a selection regarding which path to use based upon the natural language descriptions of the set of color processing paths presented, and producing a final output copy of the document based upon the data received.

Embodiments of the present invention also include a system including a user interface, a document input for receiving data representing an input document, a document output for generating a document based upon the data received, and a processor executing a color control program. The color control program produces a first output copy using a first color processing path between the document input and the document output, receives at least one user entered natural language request to modify a color in the output document based upon the first output copy, and produces a second output copy of the document using a second color processing path in response to the user entered natural language request.

Embodiments of the present invention also include another system including a user interface, a document input for receiving data representing an input document, a document output for generating a document based upon the data received, and a processor executing a color control program. The color control program produces an output copy using a first color processing path between the document input and the document output, presents natural language descriptions of the differences between one or more other color processing paths from which a user may choose and the first color processing path, receives a selection of one of the one or more color processing paths, and produces a second output copy of the document using the second color processing path.

Embodiments of the present invention also include yet another system including a user interface, a document input for receiving data representing an input document, a document output for generating a document based upon the data received, and a processor executing a color control program. The color control program presents to the user natural language descriptions of a set of color processing paths available on a document output device, receives a selection regarding which path to use based upon the natural language descriptions of the set of color processing paths presented, receives document data from the user, and produces an output copy of the document based upon the data received.

Various exemplary embodiments will be described in detail, with reference to the following figures.

A printing device as used herein refers to any device that produces visible marks on paper. Printing devices include, for example, copiers, printers, or multi-function devices. Paper as used herein refers to any markable media such as, for example, paper, plastic, and textile materials.

A document as referred to herein includes one or more pages of electronic data that can be printed or viewed on a display screen. A document can include, for example, images, graphics, and/or text.

A document output device as used herein refers to any device that receives document information, such as, for example, through a scanner or an electronic connection, and produces a user viewable document. The user viewable document may be a hardcopy or it may be an electronic copy visible on a display.

Many color document output devices typically include multiple color processing paths. The path that provides the desired output or the closest to the desired output is generally found through trial and error or a manual search. It would be simpler for a user to start with a base color processing path, enter instructions describing the differences between the color in the document produced and the desired color in the document produced, and have the device select a new processing path based upon the user's instructions.

The embodiments disclosed herein relate to a natural language color output selection system for document output devices that helps non-experts to communicate color information, intents, and instructions in a reasonably accurate and unambiguous fashion. Natural language color control has previously been disclosed more generally in U.S. patent application Ser. No. 11/479,484, "Natural Language Color Communication and System Interface," the disclosure of which is hereby incorporated by reference herein in its entirety. Embodiments of the present invention may also include a method for deriving semantic information about the color impact of a color processing path that may include ICC (or any other) color profiles or transforms. The embodiments disclosed herein could also be extended to other operations in the imaging chain.

To create a natural language device control system, a reference color processing path is chosen. Then the relationship between the reference color processing path and other color processing paths is determined. The color differences between each path and the reference path can then be translated into a natural language description of the differences between each path and the reference path.

Next, a set of color values ("sample colors") that sufficiently sample the region of color space of interest is chosen. This set of color values may be, for example, a full grid of valid color values. These colors may be those related to the document content, e.g., colors important to the document. These color values may be selected from a known device-independent color space, selected from a device-dependent color space, scanned, or otherwise loaded into the memory of the document output device.

The set of sample colors are then processed through a baseline color processing path ("base path"). This may mean processing a set of requested color values through an ICC profile to yield CMYK values ("base CMYK"). However, color paths that yield non-CMYK outputs are usable as well. For example, color paths that yield values in additive (e.g. RGB) color spaces, grayscale spaces, or spaces having more than 4 color separations may all be used as the base path. There may be other imaging operators in the chain, such as, for example, TRCs, between input and output as well. Next, the base CMYK values can be converted to colorimetric values in, for example, a CIEL*a*b* space ("base LAB").

In embodiments, the set of sample colors are also processed through each of the other color processing paths (colorpath-1, colorpath-2, colorpath-3 . . . colorpath-N) available on the document output device in addition to the base path. Each set of output values can also be converted to colorimetric values (e.g., colorpath-1-LAB, colorpath-2-LAB, . . . colorpath-N-LAB) as well.

Applying other color processing paths, which include other ICC profiles and/or other transforms, will generally produce output having a different output color profile. The base color processing path will be the baseline to which the output of other color processing paths will be compared.

Specifically, the output calorimetric values of other color processing paths (colorpath-1-LAB . . . colorpath-N-LAB) will be compared to the output colorimetric (i.e., base LAB) values of the base color processing path.

For each set of values, colorpath-x-LAB, semantic descriptions or definitions of how that set of values relates to the corresponding base values—base LAB—are then determined. By looking at the differences:

(base-LAB)−(colorpath-1-LAB)=diff-1, (base-LAB)−(colorpath-2-LAB)=diff-2,

. . .

(base-LAB)−(colorpath-$N$-LAB)=diff-$N$, where diff-x is a set of differences between the sample colors in colorpath-x and the sample colors in the base path and N is the number of color processing paths on a device.

For each set of differences, diff-x, a set of semantic descriptions can be generated that correspond to these differences. These descriptions can be used to interpret or create user instructions that will change the output values of the base-path, base-LAB, into the output values of one of the color paths, colorpath-X. These descriptions "describe" the colorimetric differences for each path with words or phrases that are easily understood by a user. This is done by identifying the sample colors that have a color difference above a specified threshold and "clustering" these colors having color differences above the threshold into groups sharing a common color name.

The assignment of colors to names would most likely be based on the base LAB values, but other methods of assigning colors to names could also be used. The set of color names might include memory colors, or colors which have well defined name boundaries but there is no restriction on the set of color names chosen, only that each color name have an associated prototypical color location. The prototypical color location could be specified in any quantitative color space, but is preferably specified in a device independent color space such as CIE L*a*b*. Common color names may include, for example, skin tone, neutral, sky, red, greens, etc., or they may simply be referred to as color-1, color-2, color-3 . . . etc. The number of color names that are determined from the above threshold differences may vary for the different paths tested.

For each color name, appropriate measures of the color differences between the baseline path and each of the other color paths are computed. There are multiple ways these differences may be computed. They could be computed, for example, by taking a simple average of all the color differences for the sample colors sharing a common color name. Alternatively, one could use a weighting function. For example, a weighting function may give more significance to sample colors that are closest to the prototypical location of the color name. The measures of color difference computed would preferably include one or more of the well defined and commonly used color difference measures such as CIE ΔE*, ΔE*94, ΔE*2000. Color differences could also be computed in a color appearance space such as CIECAM 2000. In addition to overall color difference measures, components of color difference along various perceptual directions such as lightness, chroma, or colorfulness and hue could also be computed. These latter measures are useful for creating more specific natural language descriptions of color change. Therefore, each set of differences corresponds to a vector that maps the color output values of the base path to that of the color processing path corresponding to the set of differences.

diff-1→diff-1($d1_{c1}$, $d1_{c2}$, $d1_{c3}$ . . . $d1_{cP}$)

diff-2→diff-2($d2_{c1}$, $d2_{c2}$, $d2_{c3}$ . . . $d2_{cP}$)

diff-3→diff-3($d3_{c1}$, $d3_{c2}$, $d3_{c3}$ . . . $d3_{cP}$)

. . .

diff-$N$→diff-$N$($dN_{c1}$, $dN_{c2}$, $dN_{c3}$ . . . $dN_{cP}$)

where P is the number of color names and $dN_{cP}$ represents the difference between the value of the Pth color name for the Nth color processing path and the value of the Pth color name for the base color processing path.

The differences may be rank-ordered in terms of importance. "Importance" may be defined in a variety of ways such as, for example, a set of key colors may be pre-defined as most important, derived from properties of the document, or the set of largest differences may be important. The rank-order can also be used to filter the total list, and to present only the differences greater than a predetermined threshold. Differences below the predetermined threshold may be defined as those colors with changes or spatial context below a user's perception or level of objection.

To assign a natural language color description to the color difference measures, one or more dictionaries of ordinary language color terms should be selected or generated. There is no restriction placed on the lexicon of a color name dictionary, other than that it be suitable for the intended user. While the concept of creating a color name dictionary might seem daunting, there have already been a number of successful dictionaries created. Furthermore, there is widespread commonality in the language used to describe color. Indeed, numerous studies have shown that in English and in most European languages there are only 11 basic color names (black, white, red, green, yellow, blue, brown, pink, orange, purple, and gray). Although the boundaries between these fundamental color names are somewhat fuzzy, there is widespread agreement between observers when asked to name color patches. These 11 fundamental color names are also commonly combined into compound names to allow for finer discrimination and precision in color naming. Examples of such combinations include yellowish-green, green-blue, brownish-red, reddish-purple etc. Note that there are also instances where such combinations are replaced by a new, single-word color name. For example, someone might call green-blue—cyan or turquoise, greenish-brown—olive, reddish-orange—ochre, and greenish-yellow—chartreuse. In addition, there are a number of modifiers that are commonly used in conjunction with the fundamental or compound color names. These modifiers include words such as, for example, light, dark, pale, deep, saturated, medium, dull, pastel, and so on. The color names, compound names, and modified names constitute the terms in one or more color dictionaries.

Color name dictionaries are not new. The National Bureau of Standards in collaboration with the Inter-Society Color Council has already created a standardized color name dictionary. This is called the NBS-ISCC Dictionary of Color Names. It consists of 267 color specifications with associated names. The names consist of modifiers and either fundamental or compound color names. A number of earlier studies have also developed color naming vocabularies.

A color name dictionary may be used to provide a set of color names to assign a natural language color description to the sample colors. Regions in the working color space corresponding to the set of color names of the sample colors need to be selected. It would be preferable if the locations associated with particular sample colors did not overlap. The boundary selection for each region will depend in part upon the precision of color identification desired. A variety of methods may be used to create these regions. There is no restriction on the topological genus of a region and a region may consist of multiple, non-connected sub-regions.

One means for assigning regions of color space to the terms in a color dictionary corresponding to the sample colors include using a statistical analysis of the results of psychophysical color naming studies. This method would work to directly map color terms with regions of color space or could be used to define the regions around prototypical locations in color space.

Other means for partitioning the color space include computing the Voronoi partition of a set of prototypical locations in the color space. This approach computes a convex Voronoi cell around each prototypical color space location such that all colors inside the cell are closer to the prototypical location than to any other prototypical location.

The working color space in which the prototypical locations of named colors are defined can, in theory, be any quantitative color space. However some color spaces are better suited as working spaces than others. Color spaces that are more perceptually uniform are better suited to the application but perceptually non-uniform spaces could also be used. Perceptually uniform color spaces are particularly advantageous in cases where color names are associated with prototypical locations in the color space and an algorithmic, geometrical method is used to determine the subvolumes or regions of the color space associated with each prototypical location. The embodiments disclosed herein were performed using CIEL*a*b* as a working space.

Through a set of rules, the color difference measures can be converted to a set of natural language descriptors. The specificity of the color names used to characterize color differences can vary from broad to narrow. For example, one might choose to restrict the reporting to fundamental single word color names such as, for example, red, green, orange etc. Alternatively, one might desire a little more detail by using simply qualified, two word color names such as, for example, vivid red, dark green, or greenish-yellow. The level of detail can be extended further by using even more fully detailed color names such as, for example, deep reddish-brown or pale purplish-pink. Given the varying degrees of color sophistication of the users of a document output device, it may be desirable to have multiple sets of descriptive terms with varying degrees of specificity included on the device. Appropriately detailed instructions could be activated prior to the user's receipt of the document output device, or the device could simply respond to the user's natural language instruction when identifying the correct color path to use.

Perceptual properties can include, for example, saturation, lightness, darkness, colorfulness, chroma, hue, contrast, redness, greenness, yellowness, blueness, orange-ness, pinkness, brown-ness, purple-ness, and grayness. Additionally, one could define a property that could be described as (color-name)-ness as moving the selected colors in a direction toward the prototypical location of (color-name). For example, if a selection of colors, moves toward the prototypical location of the color name 'mauve' then this color change can be defined as an increase in the mauve-ness of the selection.

The set of rules should capture at least three attributes herein referred to as color name, amount, and direction/property. Color name is simply a descriptive name for the sample colors. There are standard visual identification words that are used to describe these colors, red, blue, orange, etc. Amount would be a descriptive adjective used to characterize the magnitude of the difference between a sample color traversing the base path and the same color traversing one of the other color processing paths. One simple model is to classify the magnitudes of differences as large, medium, or small. Care should be taken if the induced change crosses a color name boundary as this may result in the perception of a new color as opposed to an alteration of an existing color. For example; at some point "blues become more purple" is more aptly described as "blues change to purple." Direction/property would be a descriptive word indicating the direction of the color change. This typically may be a color direction, e.g., redder, greener, etc. It could also be a more appearance based descriptor, e.g., warmer, cooler, brighter, darker, vivid, muted.

Each of the different color path transformations, colorpath-1-LAB, colorpath-2-LAB . . . colorpath-N-LAB, can now be described by a set of named color changes between that path and the base path. For example, colorpath-1-LAB might be described as neutrals slightly redder, blues much more saturated, greens more yellow while colorpath-2-LAB might be described as neutrals no difference, sky-blue more purple, grass-green more saturated, etc.

The relationships between the base path and each of the other color processing paths would be loaded onto the document output device or the device would be able to access these relationships. The relationships would typically be implemented through software including a user interface that would provide users with a means to specify their desired color changes or preferences using one or more natural languages.

Figure 1:
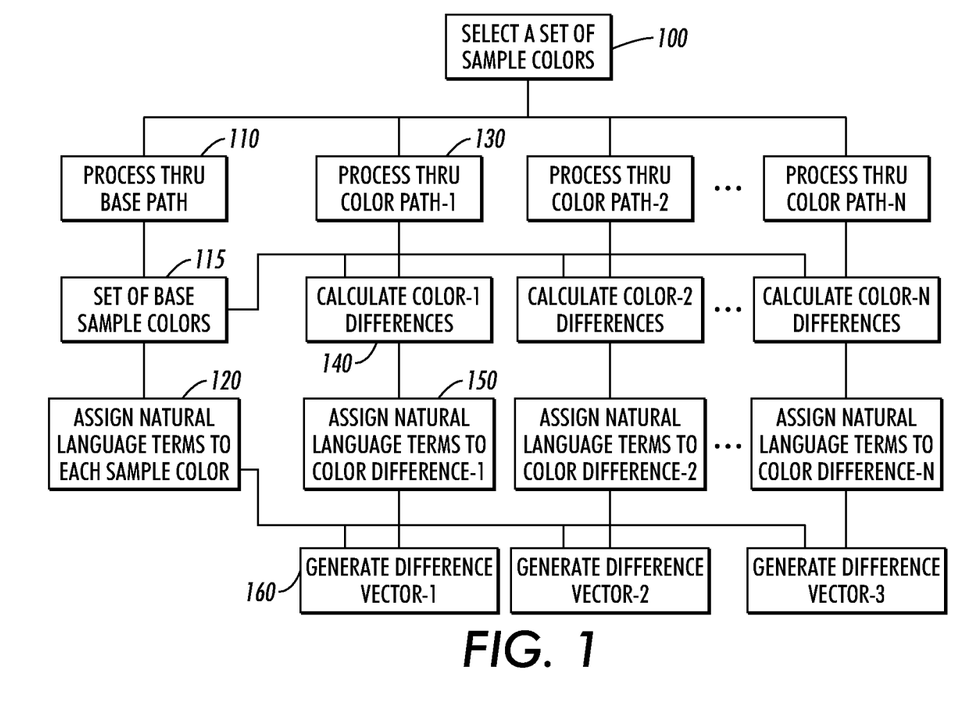
FIG. 1 is a flow chart illustrating a method for generating relationships between the color profiles of a set of color processing paths with the color profile of a particular base color processing path.

FIG. 1 is an exemplary flow chart summarizing the process just described. It is important to note that the order of many of the steps in FIG. 1 may be rearranged/combined/parsed/etc., and that the embodiments disclosed herein include many permutations of the steps in FIG. 1. First, a set of sample colors are selected 100. The sample colors are processed through the base color processing path 110. This produces a set base colors 115. Each of the sample colors is also assigned a natural language definition 120. This definition may be taken from a preexisting color dictionary or may be created as part of a new dictionary. Steps 110 and 120 are not necessarily consecutive and may be performed in any order or simultaneously. For example, the assignment of color names may be based upon the output of the base processing path or it may be based upon the originally chosen sample colors. The set of sample colors defined in 100 and used in 110 are now separately processed through a series of color processing paths 1-N 130, where N is the number of color processing paths available to a device other than the base color processing path. While steps 130-160 refer to color processing path 1 (Color-1), these steps also apply to each of the remaining N−1 color processing paths. Steps 130-160 are repeated for each of the color processing paths other than the base color processing path. It is important to note that the order of many of the steps after 130 may be rearranged/combined/parsed/etc., and that the embodiments disclosed herein include many permutations of these steps. The difference between the output of each of the sample colors after passing through the Color-1 processing path and the corresponding base sample color 115 is then determined 140. For each sample color, the difference in color profile between the base color processing path and Color-1 is assigned a natural language description 150. The set of differences can be combined into an array or a difference vector 160 of natural language differences. As noted, this process is then performed for each of the other N−1 color processing paths.

These natural language color difference descriptions may also be applicable across different devices or media. For example, one might compare a print from document output device-1 to a print from document output device-2, go through a similar set of operations as described above, and tell the user what the color differences will be.

Sometimes, it may be useful to use a multiplicity of color name dictionaries to cover the different types of vocabularies of users. In cases where multiple color dictionaries are used, each dictionary could be mapped independently onto color space regions or lexical mappings between the various dictionaries could be developed.

It is possible to forgo the base path and simply have a set of differences for each pair of color processing paths. Comparisons could be made between each color processing path and every other color processing path. Therefore, there would be no base values, only relative descriptions of the differences between each pair of color processing paths. This would allow the default color processing path setting to be changed freely. However, this would require more memory and effort to create all the semantic mappings that would be required.

Figure 2:
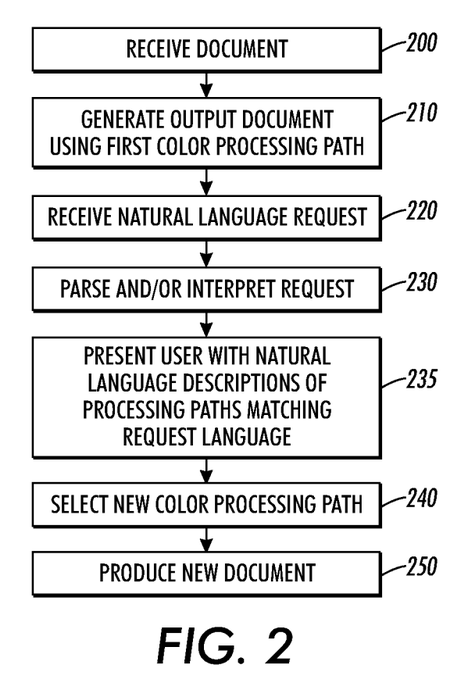
FIG. 2 is a flow chart illustrating an exemplary method that can be implemented in a document output device.

Once the other color processing paths are all mapped, a user may take advantage of these mappings to more easily select a color processing path to use. FIG. 2 is a flowchart illustrating the process a user might follow in practice. The user of a document output device would first have the device produce a document. The device would receive a document 200 from a user. The user would send a document to the device by, for example, scanning the document at the device or electronically sending the document to the device. The document output device would then generate a first output copy of the document 210. This document would be produced using one of a plurality of color processing paths. This could be a default path or a user-selected path. The user would review the output and if the color were unsatisfactory, the user would enter any desired changes to the output. These changes would be received by the device in a natural language description 220 as stated herein. In embodiments, a lexicon may be available to the user so that the user can tailor his/her request to terms the device will "understand." Otherwise, the device may simply parse and/or interpret 230 the user's request, and issue an error other message if the device does not understand the request. Based upon the desired changes received by the device, the device could then select a new color processing path that best addresses the user's requested changes 240. For example, if the user, requested that the blues be lighter and the greens, greener, the device would search through the other color processing paths and color profiles available to it, determine which one, if any, has lighter blue and greener greens and minimally affects the other colors in the image. The document output device would generate a second output copy of the document 250 using the new color processing path. The first and/or second output copy may, for example, be present on a display or a hardcopy output from a printing device.

If the results were still unsatisfactory, the user could enter new changes in natural language that the user desired. The number of iterations to this process will typically be less than the user simply trying one processing path after another. The number of iterations required could also be shortened by the level of detail in the changes the user enters after each print. As previously noted, a document output device may be programmed to accept one or more levels of detail.

Step 235 is optional and would present the user with natural language descriptions or sample color palettes of color processing paths corresponding to the user's natural language request. For example, the user may request darker reds and three other available color processing paths have darker reds. In such a case, the device may present the user with natural language descriptions and/or sample color palettes of the three color processing paths that produce darker reds. The sample color palettes would display colors or color distinctions relevant to the user's natural language request. The color palettes may, for example, also show other relevant distinctions between each other or between themselves and the first color processing path. If the user is presented with natural language descriptions of color processing paths corresponding to the user's natural language request per step 235, the user would then be the one to select a color processing path from among those presented in step 240.

Assuming the user does not manually select the new color processing path, the selection process in step 240 may be performed automatically in a variety of ways. First, trivially, if only one color processing path meets the user's request, then that color processing path will be chosen. However, where multiple color processing paths meet the user's natural language request, the device may, for example, map the natural language color shifts to numerical values and a variety of least-error fits to a P-dimensional set of vectors can be performed for each color space. The individual differences making up the difference vectors ($dX_{c1}$, $dX_{c2}$, $dX_{c3}$ ... $dX_{cP}$) could be represented as scalar values and, for example, be squared and summed and the color space having the smallest sum may be selected. As different color shifts may correlate to different perceptual differences, the individual color shifts may be weighted as well.

In step 230, the natural language instruction parses and/or interprets the user's request. Parsing and interpreting will generally include parsing the verbal color specification to determine 1) the magnitude of the desired modification, 2) the property that is to be modified, and 3) the direction in which it is to be modified. These three pieces of information are a minimum requirement for any color profile selection.

First, a verbal color modification specification is parsed to obtain verbal specifications for the color property to be modified, the magnitude of the color modification, and the desired direction of color modification. An example of parsing a natural language image editing instruction is illustrated in Table 1 below.

TABLE 1

| | |
|---|---|
| Natural language image editing instruction | Make the red colors slightly less saturated |
| Target color range specification | The red colors |
| Color modification specification | Slightly less saturated |
| Verbal description of color property to be modified | Saturation |
| Verbal magnitude of color modification | Slight |
| Verbal direction of color modification | Less |

The instruction, "The red colors should be slightly less saturated" is first parsed into a target color range specification (the red colors), and a color modification specification (slightly less saturated), as noted earlier. Then the color modification specification is parsed into the color property to be modified (saturation), the magnitude of the color modification (slightly), and the direction of the color modification. After parsing, the device would identify a color processing path that would best align with the instruction(s) entered by the user.

In embodiments, the verbal description of a desired color change may be mapped to a numerical normalizing scale factor. A user requests that yellows be darker may require a more significant shift in color space than a request that the reds be darker. Therefore, a color profile selected to correspond to darker yellows may be shifted further in the color space of the device than a color profile selected to correspond to darker reds. Thus, magnitude specifications would be normalized such that the verbal descriptions of magnitude correspond to equivalent or very similar perceptual differences to colors regardless of the color the user wants changed. For this example, the magnitude of color change requested is "slight" and this should lead to a perceptually similar "slight" change in the target "red" colors and the target "yellow" colors.

Further, perceptual changes in a property will likely depend in part upon the color being modified and its density in the image. The magnitude of a property change could depend upon the document being considered. For example, what constitutes a "slight" darkening of cyan in an image would likely be different if there was a low saturation of cyan in the image, then if there was a high saturation of cyan. Therefore, selection of a new color profile could be based in part on the color content of the test document itself. When the user reviews the output document and requests that the cyan be slightly darker, the profile selected may depend on the blue content of the document itself because the difference to the user may be perceptually high enough at one level of saturation, but below a noticeable level at another.

Figure 3:
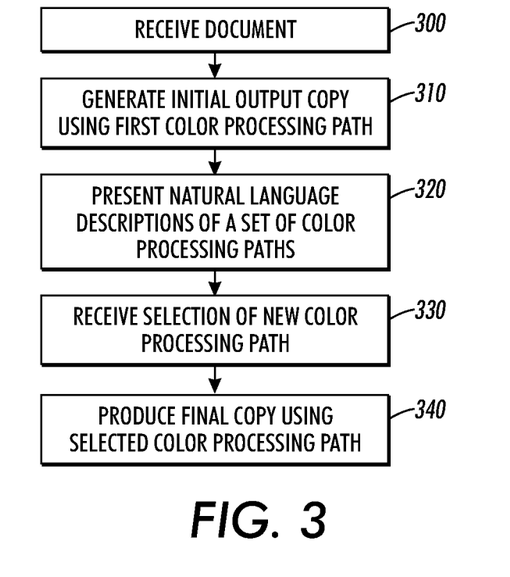
FIG. 3 is a flow chart illustrating another exemplary method that can be implemented in a document output device.

FIG. 3 illustrates an alternative exemplary embodiment of a color processing path selection method. The device would again receive data corresponding to a document 300. In embodiments, the device may produce an initial output copy of the document using a first or initial color processing path 310. However, producing an initial copy is optional. The device would also present the user with natural language descriptions of a set of color processing paths available on a document output device 320. Where step 310 has been performed, the natural language descriptions may include differences between the set of color processing paths and the first processing path. Otherwise the descriptions may just highlight the most relevant or individual characteristics of each of the color processing paths. The natural language descriptions may also be accompanied by a sample palette that could be shown to the user using a GUI of some kind. The user would then be able to select one of the color processing paths which would be received by the device 330. The document output device would then generate a final output copy of the document 340.

Figure 4:
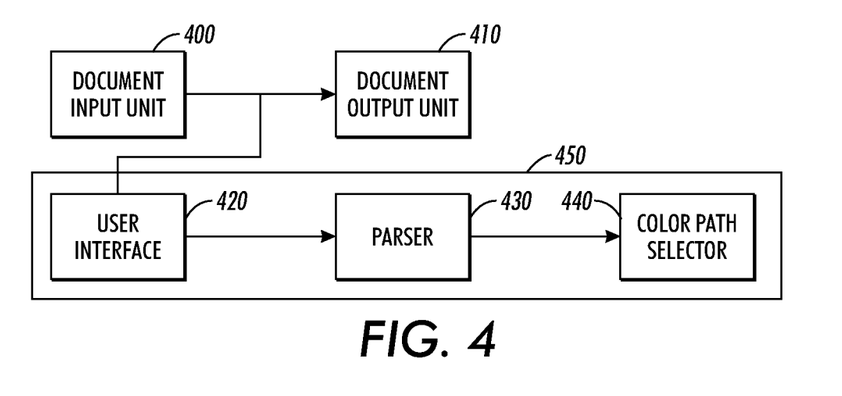
FIG. 4 is a schematic illustration of an apparatus for accomplishing the method of FIGS. 2 and 3.

FIG. 4 schematically illustrates an exemplary apparatus that may be used for accomplishing the methods shown and described in FIGS. 2 and 3. It is important to note that many or all of these components may be part of the same device. All actions taken by the components described herein may be performed using a common processor or array of processors. A document or image input unit 400 would be the source of data corresponding to a document. The input unit 400 could be, for example, a color scanner, a personal computer, or workstation with appropriate document or image creation software, a camera or a data storage device, or internet linked electronic storage. A document output unit 410 is connected to the document input unit 400. The document output unit 410 produces a document that a user may review. The user may then communicate a natural language request or requests through the user interface 420. The user interface may include a GUI that would be able to display color palettes of various color processing paths. The apparatus may also contain a parser 430 for parsing requests entered by a user. In embodiments, the parser 430 reduces the natural language request or requests into a color (or colors) that should differ, and the difference to that color that should be seen in the next version of the document generated by the device. Color path selector 440 then selects the color processing path having the color profile that best meets the natural language request or requests. User interface 420, parser 430, and color path selector 440 may all be located on a processor 450. The processor 450 may also control the document input unit 400 and the document output unit 410. After the color path selector 440 selects the new color path, the document output unit 410 may produce a new document using the newly selected color processing path either automatically or at the instruction of the user.

Each color profile may also be associated with a natural language description of differences between that profile and the base profile. This description may be stored where the device may access it. In addition to entering desired changes, a user may be able to review the color difference descriptions associated with the non-base color profiles. For example, colorpath-1-LAB might be labeled with the following descriptive phrases: neutrals slightly redder, blues much more saturated, and greens more yellow. A user may be able to review a list of color paths and select one that appears to include the changes in output the user desires.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

We claim the following:

1. A system, comprising:
    a user interface;
    a document input device configured to receive data representing an input document;
    a document output device configured to generate a document based upon the data received; and
    a processor executing a color control program, the processor configured to:
        select a set of sampling color values;
        process each selected sampling color value using a first color processing path between the document input device and the document output device to generate a reference output color profile;
        process each selected sampling color value using color processing paths available on the document output device other than the first color processing path to generate remaining output color profiles;
        determine differences between the reference output color profile and each of the remaining output color profiles;
        assign natural language descriptions to the determined differences;
        present the natural language descriptions of the determined differences to a user;
        receive a selection of one of the presented natural language descriptions from the user; and
        produce an output copy using one or more color processing paths that correspond to the selected natural language description.

2. The system of claim 1, wherein the user interface displays a graphical image of a palette relevant to the determined differences.

3. The system of claim 1, wherein the differences are rank-ordered based on predefined characteristics.

4. The system of claim 3, wherein the differences are rank-ordered from a most relevant pre-defined key colors to a least relevant pre-defined key colors.

5. The system of claim 3, wherein the differences are rank-ordered from a highest difference to a lowest difference.

6. The system of claim 3, wherein the differences are rank-ordered based on properties of input document.

7. The system of claim 3, wherein the processor is further configured to filter the rank-ordered differences and to present to the user only the differences greater than a predetermined threshold.

8. The system of claim 1, wherein the set of sampling colors sample a region of color space.

9. The system of claim 1, wherein the set of sampling colors includes a grid of valid colors.

10. A method, comprising:
performing the following steps using one or more processors:
  receiving data representing an input document;
  selecting a set of sampling color values;
  processing each selected sampling color value using a first color processing path between the document input device and the document output device to generate a reference output color profile;
  processing each selected sampling color value using color processing paths available on the document output device other than the first color processing path to generate remaining output color profiles;
  determining differences between the reference output color profile and each of the remaining output color profiles;
  assigning natural language descriptions to the determined differences;
  presenting the natural language descriptions of the determined differences to a user;
  receiving a selection of one of the presented natural language descriptions from the user; and
  producing an output copy using one or more color processing paths that correspond to the selected natural language description.

11. The method of claim 10, wherein the set of sampling colors sample a region of color space.

12. The method of claim 10, wherein the set of sampling colors includes a grid of valid colors.

13. A system, comprising:
a user interface;
a document input device configured to receive data representing an input document;
a document output device configured to generate a document based upon the data received; and
a processor executing a color control program the processor configured to:
  select a set of sampling color values;
  process each selected sampling color value using a set of color processing paths between the document input device and the document output device to generate a set of output color profiles;
  determine the differences between each output color profile and every other output color profile;
  assign natural language descriptions to the determined differences;
  present to a user the natural language descriptions of the determined differences;
  receive a selection of one of the presented natural language descriptions from the user; and
  produce an output copy using one or more color processing paths that correspond to the selected natural language description.

14. The system of claim 13, wherein the differences are determined between each pair of output color profiles.

15. The system of claim 13, wherein the set of sampling colors sample a region of color space.

16. The system of claim 13, wherein the set of sampling colors includes a grid of valid colors.

* * * * *